Figure 1:
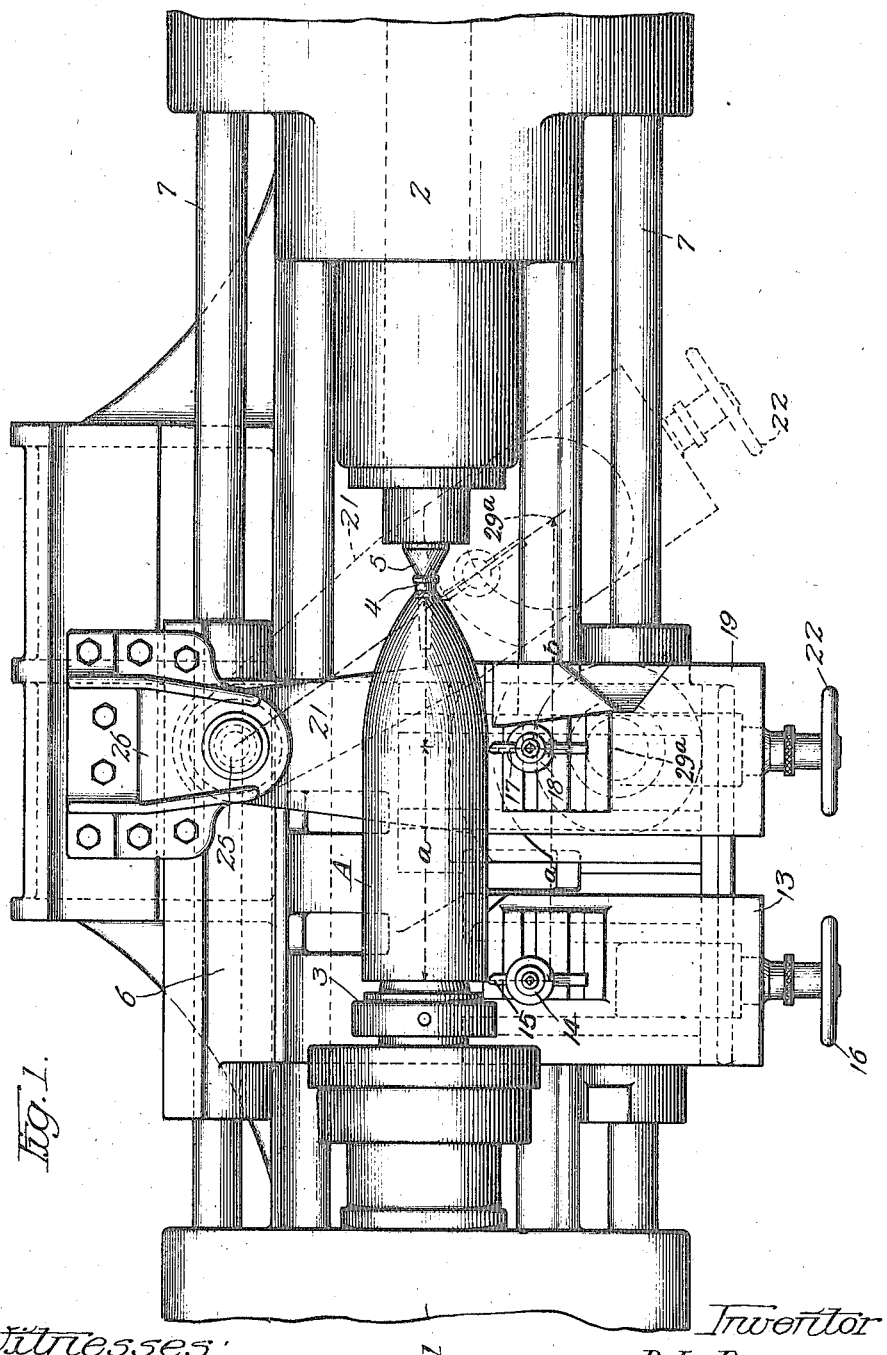

D. L. DERROM.
LATHE.
APPLICATION FILED NOV. 20, 1916.

1,264,375.

Patented Apr. 30, 1918.
2 SHEETS—SHEET 1.

Witnesses:
Robert H. Weir
Arthur W. Carbery

Inventor
D. L. Derrom
By Miller Chindahl Parker
Attys

D. L. DERROM.
LATHE.
APPLICATION FILED NOV. 20, 1916.
1,264,375.
Patented Apr. 30, 1918.
2 SHEETS—SHEET 2.
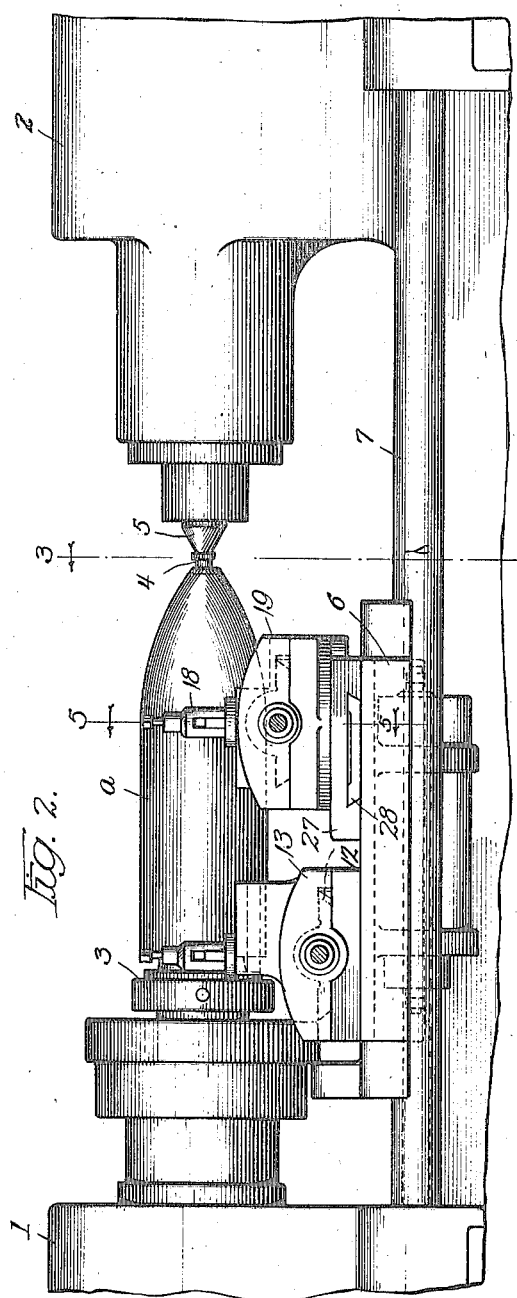
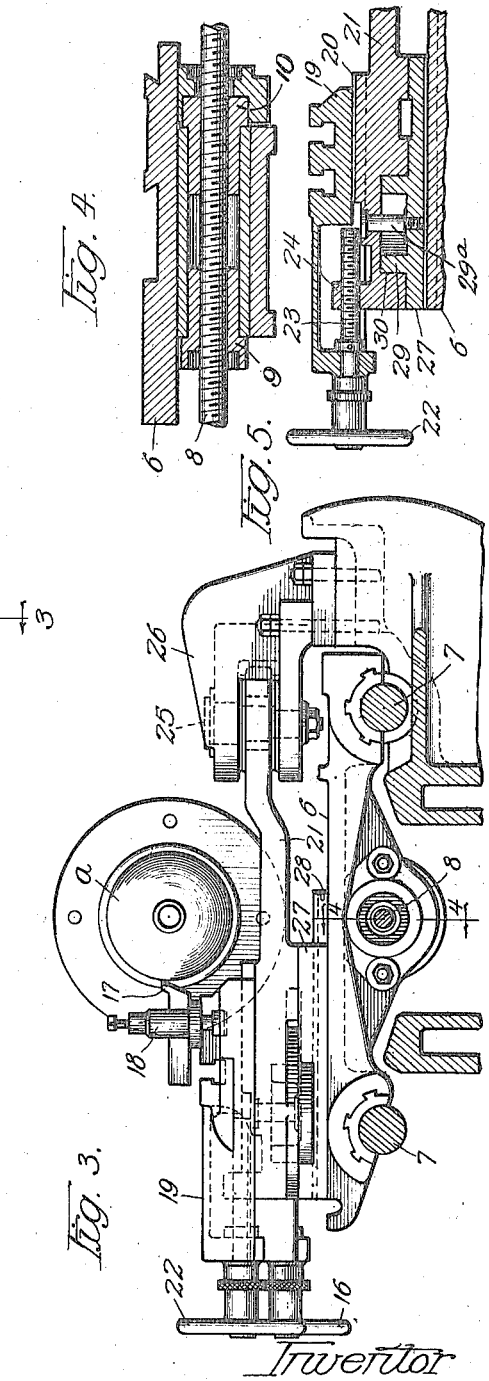
Witnesses:
Robert Stein
Arthur W. Carlberg
Inventor
D. L. Derrom
By Miller Chindahl & Parker
Attys.

UNITED STATES PATENT OFFICE.

DONALD L. DERROM, OF MONTREAL, QUEBEC, CANADA.

LATHE.

1,264,375.    Specification of Letters Patent.    Patented Apr. 30, 1918.

Application filed November 20, 1916. Serial No. 132,265.

*To all whom it may concern:*

Be it known that I, DONALD LAIRD DERROM, a subject of the King of Great Britain, residing at Montreal, in the Province of Quebec, Dominion of Canada, have invented certain new and useful Improvements in Lathes, of which the following is a specification.

The object of this invention is to provide improved means for automatically producing a surface such as that generated by the revolution of an arc of a circle about an axis not its own. For the sake of brevity, such a surface will be herein termed a conoidal surface.

In the accompanying drawings, Figure 1 is a fragmental top plan view of a lathe embodying the features of my invention. Fig. 2 is a fragmental side elevation of the machine. Fig. 3 is a vertical sectional view taken in the plane of line 3—3 of Fig. 2. Fig. 4 is a section on line 4 of Fig. 3. Fig. 5 is a section on line 5—5 of Fig. 2.

The embodiment herein shown of the invention comprises a head-stock 1 and a tail-stock 2 of any suitable construction. While the invention is applicable to the production of various kinds of articles, the present embodiment of the invention is particularly adapted for turning the cylindrical body and conoidal forward end of a shell A. The driving spindle or live center of the head-stock 1 is provided with a chuck 3 adapted to grip the interior of the rear end of the shell. A tapered plug 4 adapted for engagement by the dead center 5 of the tail-stock 2 may be inserted in an opening in the forward end of the shell.

The tool-post carriage may be of any preferred construction and may be supported in any suitable manner. Herein is shown a carriage 6 slidably mounted upon two parallel guides 7 extending parallel with the axes of the head-stock spindle and the tail-stock spindle. Any desired means may be employed for moving the carriage 6 upon the guides 7. Herein is shown a lead-screw 8 extending parallel with and between the guides 7. Nuts 9 and 10 (Fig. 4) are rigidly secured in a suitable manner to the carriage 6 and are engaged by the lead-screw 8.

The carriage 6 is arranged to support a tool for turning the cylindrical surface of the shell and is also arranged to impart movement to a tool for turning the conoidal tip of the shell. The means for supporting the cylindrical-surface tool may be of any suitable character. Herein I have shown the carriage 6 as provided with a guide 12 (Fig. 2) extending transversely of the path of movement of the carriage. On this guide is mounted a tool-post slide 13 to which a tool post 14 may be adjustably secured. 15 is a cutter fixed in said tool post. A hand-wheel 16 and a screw and nut of usual form (not illustrated) provide means for setting the tool-post slide 13 upon the carriage 6 with the end of the tool 15 at the desired distance from the axis of the shell.

The tool 17 for turning the conoidal surface of the shell is fixed in a tool post 18 which is adjustably secured upon a tool-post slide 19. The slide 19 is mounted upon a guide 20 (Fig. 5) which extends longitudinally of a radius link 21. A hand-wheel 22 fixed to a screw 23 provides means for setting the tool-post slide 19 in desired position upon the radius link, said screw engaging a nut 24 on the radius link 21. The link is pivoted at 25 to a bracket 26 which is rigidly secured to the main frame of the lathe.

Means is provided for connecting the radius link 21 to the carriage 6 so that said link shall be swung as the carriage is moved upon its guides 7. The means herein shown for thus connecting the radius link to the carriage comprises a slide 27 mounted upon a guide 28 on the carriage 6, which guide extends at a right angle to the direction of travel of the carriage. Upon the upper side of the slide is a circular boss 29 (Fig. 5) that fits into a circular recess 30 in the lower side of the radius link 21 and serves as a pivot connecting the radius link and the slide 27. 29$^a$ indicates the axis of the pivot 29. It will be seen that as the carriage 6 is moved upon its guides 7 the radius link 21 will be pivotally moved, the slide 27 moving in or out upon its guide 28.

The tool 17 should be so set that the work will revolve against the cutting edge of the tool. In the case of a cutter of the form herein shown, the cutter should extend substantially radially of a circle struck from the center 25.

When turning an article in which the conoidal surface merges in the cylindrical surface, as in the case of the shell A, the tool-post slides 13 and 19 should be set so that the points of the cutters are at the same distance from the axis of the shell, when the radius link 21 extends at a right angle to the axis of the shell. Assuming that the cutters are properly set and that the carriage 6 is at the right-hand end of its path of movement, the operation is as follows: A shell A is properly mounted upon the lathe centers and secured to the live center by means of the chuck 3. The machine is then set in operation, causing the shell to be revolved and the carriage 6 to be fed toward the head-stock. In the travel of the carriage, the cutter 15 is moved in a straight line along the shell to the rear end thereof, thereby forming the cylindrical surface of the shell. In the travel of the carriage 6, the radius link 21 is swung upon its axis 25, thereby carrying the cutter 17 through an arc of a circle struck from said axis, whereby said tool is caused to turn the conoidal portion of the shell.

By referring to Fig. 1, it will be seen that the dimensions $a$ and $b$ are equal, thus bringing the center $29^a$ on which the radius link 21 and the slide 27 are connected so much farther away from the center 25 than the point of the nose-turning tool 17 that said tool will travel at a sufficiently lower speed so as to finish its cut in the same length of time taken by the body-turning tool 15 in turning the body. By reason of such reduction of the feed of the tool 17 on the nose (where there is always very much more stock to remove than on the body), and in view of the lower surface speed of the nose as compared with the body (due to the difference in diameter), I am able to remove a very much greater quantity of metal from the nose in a given time than would be possible if the nose-cutting tool 17 were forced to travel at the same rate as the body-turning tool 15. Consequently, all of the metal to be removed in roughing out the nose and the body of the shell can be taken off in one cut, that is to say, in one stroke of the carriage 6.

In prior machines the tool for forming the conoidal surface of the shell has been maintained at right angles to the axis of the shell, and therefore in cutting the surface adjacent to the tip of the shell the cutter has been carried sidewise against the work. Owing to the disadvantageous position of the cutter, it has been necessary to take a plurality of cuts in roughing out the conoidal surface of the shell. In the present construction, the cutter always occupies a radial position with relation to the curved surface of the shell and thus is properly presented to the stock and is therefore able to rough out the conoidal surface of the shell in one cut.

I claim as my invention:

A lathe having, in combination, a main frame, means on said frame for rotatably supporting the work, a single carriage movable in a path parallel with the axis of the work, a cutter mounted on said carriage for cutting the cylindrical body of the work, a radius link pivoted to the frame, a cutter mounted on said link for cutting the conoidal nose of said work, the pivot of said link being at the side of the work opposite to that occupied by said cutters, a member on the carriage slidable transversely of the carriage, a pivot connecting the radius link to said member, the nose cutter being located between said pivots, and the second mentioned pivot being at such a distance from the first mentioned pivot that when the nose cutter is in initial position the distance of the second mentioned pivot from the transverse plane lying between the body and the nose of the work equals the length of the body of the work.

In testimony whereof, I have hereunto set my hand.

DONALD L. DERROM.